(12) United States Patent
Manger et al.

(10) Patent No.: US 12,027,917 B2
(45) Date of Patent: Jul. 2, 2024

(54) ELECTRIC MOTOR

(71) Applicant: Brose Fahrzeugteile SE & Co. Kommanditgesellschaft, Würzburg, Würzburg (DE)

(72) Inventors: Steffen Manger, Volkach (DE); Sven Anton Büchner, Frankenbrunn (DE); Benjamin Nelson, Dettelbach (DE); Florian Winter, Hammelburg (DE); Anna Feser, Erlabrunn (DE); Steffen Reiher, Strahlungen (DE); Christof Goeke, Würzburg (DE); Marcus Balsam, Ochsenfurt (DE)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 443 days.

(21) Appl. No.: 17/421,946

(22) PCT Filed: Jan. 9, 2020

(86) PCT No.: PCT/EP2020/050409
§ 371 (c)(1),
(2) Date: Jul. 9, 2021

(87) PCT Pub. No.: WO2020/144266
PCT Pub. Date: Jul. 16, 2020

(65) Prior Publication Data
US 2022/0115923 A1  Apr. 14, 2022

(30) Foreign Application Priority Data
Jan. 10, 2019 (DE) ............... 10 2019 200 254.4

(51) Int. Cl.
*H02K 1/18* (2006.01)
*H02K 5/08* (2006.01)
*H02K 5/15* (2006.01)

(52) U.S. Cl.
CPC ............... *H02K 1/185* (2013.01); *H02K 5/08* (2013.01); *H02K 5/15* (2013.01)

(58) Field of Classification Search
CPC . G06F 12/0822; G06F 12/1054; H02K 1/185; H02K 11/33; H02K 5/04; H02K 5/08; H02K 5/15
See application file for complete search history.

(56) References Cited

U.S. PATENT DOCUMENTS 9,318,933 B2  4/2016  Yoshitomi et al.
9,605,464 B2 *  3/2017  Kessler ............... H02K 1/17
2014/0028128 A1 *  1/2014  Yoshitomi ........... H02K 3/525
310/71

FOREIGN PATENT DOCUMENTS

CN  203482024 U  3/2014
DE  2546666 A  * 4/1976  ............ H02K 1/185
(Continued)

OTHER PUBLICATIONS

DE-102014201491-A1, Gieselmann et al., all pages (Year: 2015).*
(Continued)

*Primary Examiner* — Naishadh N Desai
(74) *Attorney, Agent, or Firm* — Dickinson Wright PLLC (57) ABSTRACT

An electric motor which is designed as an internal rotor, comprising a laminated stator core and a functional support which is arranged on a rear side that faces away from an output side of the laminated stator core. The functional support includes a plastic housing and connecting elements which are integrated in the plastic housing and protrude therefrom in the axial direction of the laminated stator core. The functional support is interlocking and/or integrally (Continued)

connected to the laminated stator core in the axial direction at a lateral outer surface of the laminated stator core by means of the connecting elements.

19 Claims, 5 Drawing Sheets

(56) References Cited

FOREIGN PATENT DOCUMENTS

| | | | |
|---|---|---|---|
| DE | 2546666 A1 | 4/1976 | |
| DE | 102008053233 A1 | 2/2010 | |
| DE | 102008048199 A1 | 4/2010 | |
| DE | 102011001347 A1 | 9/2011 | |
| DE | 102014201491 A1 * | 7/2015 | ........... F04D 13/064 |
| DE | 102015120563 A1 | 6/2017 | |
| EP | 1215803 A2 | 6/2002 | |
| GB | 2061775 A | 5/1981 | |
| WO | 2008019818 A1 | 2/2008 | |
| WO | WO-2008019818 A1 * | 2/2008 | ............. F04D 13/06 |
| WO | 2009083363 A2 | 7/2009 | |

OTHER PUBLICATIONS

DE-2546666-A, all pages (Year: 1976).*
WO-2008019818-A1, Mikkelsen, all pages (Year: 2008).*
Chinese Office Action for CN 202080008169.5 dated Oct. 24, 2023, Google English Machine Translation attached to original, All together 14 Pages.

* cited by examiner

ELECTRIC MOTOR

CROSS-REFERENCE TO RELATED APPLICATIONS

This application is the U.S. National Phase of PCT Application No. PCT/EP2020/050409 filed on Jan. 9, 2020, which claims priority to German Patent Application No. DE 10 2019 200 254.4, filed on Jan. 10, 2019, the disclosures of which are hereby incorporated in their entirety by reference herein.

TECHNICAL FIELD

The present disclosure relates to an electric machine, in particular an electric motor.

BACKGROUND

Electric machines, in particular electric motors, are conventionally in the form of so-called internal rotor or external rotor motors. This describes the arrangement of the rotor, which is set in rotation by alternating magnetic fields, with respect to the stator that produces the magnetic fields. In an internal rotor motor, the rotor is arranged coaxially with and radially inside the stator. In an external rotor motor, the rotor, correspondingly conversely, is arranged so as to be rotatable about the stationary stator, in particular so as to encompass the stator in the manner of a tube.

Conventionally, electric machines, specifically electric motors, are housed in a housing which on the one hand offers protection against environmental influences (and, in particular in the case of an external rotor motor, also prevents access to rotating parts) and on the other hand also provides fastening points for further components. Such components are, for example, transmissions or other driven elements, for example indirectly or directly driven pumps, motor electronics or the like, which are connected to the rotor on the output side. In order to save installation space, internal rotor motors can also be configured substantially without a housing, at least without an at least partially tube-like housing surrounding the stator. For example, such an internal rotor motor can also be flushed (for example for cooling purposes) with a fluid, in particular oil. In this case (without a housing), fastening points are arranged on the stator, which is conventionally formed by a laminated core, to which fastening points there can be connected, for example, the downstream transmission and/or bearing plates arranged on the end face relative to the stator.

In such a case, the motor electronics are frequently positioned spatially separately from the assembly group formed by the stator and the above-described components and is connected to the assembly group via a cable harness.

SUMMARY

The object underlying the invention is to provide an improved electric machine.

The electric machine according to one or more embodiments is in the form of an internal rotor (motor) and may form an electric motor. The electric machine may include a laminated stator core and a functional support which is arranged on a rear side (also referred to as the B-side) that is remote from an output side (also referred to as the A-side hereinbelow) of the laminated stator core. The functional support has a plastic housing in which there may be arranged an interconnect device. This interconnect device with electronic components arranged thereon may form a motor controller (or "control electronics") of the electric machine. The functional support further may include connecting means which are integrated into the plastic housing and protrude therefrom in the axial direction of the laminated stator core. The functional support is connected by connecting means to the laminated stator core at a lateral outer surface of the laminated stator core by positive engagement and/or substance-to-substance bonding in the axial direction.

The connection by positive engagement and/or substance-to-substance bonding may be provided such that no fastening elements that are to be mounted separately, in particular no additional elements that protrude in the radial direction (in particular screws or the like), are used.

Because the functional support is connected directly to the laminated stator core, a stator housing which surrounds the laminated stator core at its lateral outer surface, and to which the functional support is also attached, can advantageously be omitted. As a result, the electric machine can be produced compactly and advantageously also inexpensively.

In the case where the motor controller is integrated into the plastic housing of the functional support, an additional interface for spatially extensive (electrical and optionally also mechanical) connection between the laminated stator core and the motor controller can additionally also be omitted.

In another embodiment, the functional support is centered radially relative to the laminated stator core.

As an example, the functional support is centered relative to the laminated stator core or a so-called B-side bearing plate arranged on the rear side thereof by means of centering ribs (or bars) which in particular are formed (such as injection molded) on the plastic housing. In addition or alternatively, centering takes place by means of the connecting means (in particular relative to the laminated stator core) themselves.

In one or more embodiments, the connecting means are formed by a plurality of metal lugs which are embedded into the plastic housing of the functional support by injection molding. Consequently, the plastic housing is injection molded from a thermoplastic plastic material and the metal lugs thereby form so-called inlays which are overmolded with the plastic material of the plastic housing. The metal lugs may be comparatively flat—or also: thin—lugs of sheet metal which lie with their flat side against the laminated stator core, specifically against the lateral outer surface thereof. Furthermore, the metal lugs are welded to the laminated stator core on the lateral outer surface thereof. A space-saving construction of the electric machine, when seen in the radial direction of the laminated stator core, is thereby achieved. Moreover, additional connecting elements, for example screws and/or nuts, can thus be omitted.

In another embodiment, the metal lugs are not overmolded with the plastic material but are subsequently pressed into the plastic housing, sunk into the plastic housing by means of ultrasound or the like.

In another embodiment, the laminated stator core has a radially protruding contact surface for each metal lug. Each radially protruding contact surface may be in the form of a type of plateau which protrudes above the main body of the laminated stator core.

In a further embodiment, the metal lugs are formed by "beams" or "arms", which are bent in the axial direction, of a one-piece, star-shaped stamped sheet-metal part. The center, at which the beams meet, of this stamped sheet-metal part is arranged on the end face relative to the laminated stator core (such as perpendicularly to the axis of rotation of the rotor). This one-piece form of the metal lugs simplifies the production of the functional support, specifically the positioning and injection molding of the metal lugs into the plastic housing.

In one or more embodiments, the functional support abuts the laminated stator core or the B-side bearing plate in the axial direction. The functional support and/or the laminated stator core, or the B-side bearing plate, may have for this purpose a corresponding stop surface. The axial position of the functional support relative to the laminated stator core can thereby be specified in a simple manner.

In an alternative embodiment, the functional support, when seen in the axial direction, is spaced apart from the rear side of the laminated stator core or from the B-side bearing plate. In this case, the functional support, on mounting of the electric machine, is first pushed up against the B-side bearing plate or the laminated stator core and then pulled back slightly by a predefined distance. In this case, there are optionally formed in the metal lugs hooks or similar latching structures—for example an eye, notches or the like—with which the metal lug catches on a catching structure, for example a pin or the like, which may be arranged on the contact surface of the laminated stator core. For example, the functional support with the metal lug is in this case first pushed "too far" over the pin, so that, as the functional support is pulled back, the pin catches in the hook-like structure of the metal lug when the intended distance between the functional support and the laminated stator core is reached.

In another embodiment, the electric machine also may include the above-described B-side bearing plate. The B-side bearing plate is manufactured from metal (such as sheet metal) and has mounting lugs—such as likewise bent in the axial direction—which lie against the lateral outer side of the laminated stator core and are welded thereto. The mounting lugs may be arranged beneath the metal lugs of the functional support—that is to say between the lateral outer surface and the metal lugs. The mounting lugs extend in the axial direction along the lateral outer surface of the laminated stator core by a shorter distance than the metal lugs of the functional support. Moreover, the mounting lugs are enclosed in a gap defined by the radially protruding contact surface (provided for the metal lugs) of the laminated stator core. The metal lugs of the functional support and the mounting lugs of the bearing plate can thereby be welded to the laminated stator core in a common manufacturing step. Manufacture of the electric motor is thereby simplified further.

In another embodiment, the laminated stator core, in the intended final mounted state, is free of a stator housing surrounding the laminated stator core on the circumferential side. The mounting lugs, or the metal lugs, which lie against the lateral outer surface extend, at least when seen in the circumferential direction, only locally over the lateral outer surface of the laminated stator core and consequently do not constitute such a stator housing.

In an alternative embodiment which forms an independent invention, the functional support is connected to the laminated stator core only by positive engagement, such as by means of a latching or snap-in connection.

For this purpose, the metal lugs described hereinbefore have notches or projections, for example extending in the circumferential direction, which latch with projections protruding for example radially from the laminated stator core. Alternatively, there are formed on or in the laminated stator core projections or depressions which are offset slightly from one lamination to the next. These cooperate with corresponding projections, which are offset relative to one another in a step- or tooth-like manner, or with a groove, which is offset in a step-like manner, in the metal lug, or with a holding lug, molded from plastic material, of the plastic housing, in that the projections or depressions engage into one another by the lock and key principle, optionally with slight elastic deformation.

Further alternatively, the plastic housing (for example the metal lug or a holding lug, molded in one piece, which engages axially over the laminated stator core) has on a side facing the laminated stator core at least one pocket. There is formed on the laminated stator core or the B-side bearing plate a T-shaped pin which receives a clip formed of spring wire. The clip is pushed against the functional support until a smallest possible shoulder of the clip is enclosed in an undercut in the pocket.

Further alternatively, the plastic housing has a number of clips which are pushed over a T-shaped post on the lateral outer surface of the laminated stator core or the B-side bearing plate. One of the clips, may include a slot therein, thereby latches with the post and forms a positive engagement in the circumferential direction of the laminated stator core. For axial fixing, the T-shaped post is then deformed in the radial direction and thereby clamps the clip.

The conjunction "and/or" is to be understood here and in the following such that the features linked by this conjunction can be provided both together and as alternatives to one another.

BRIEF DESCRIPTION OF THE DRAWINGS

An exemplary embodiment of the invention will be described in greater detail hereinbelow with reference to a drawing, in which.

Mutually corresponding parts are always provided with the same reference numerals in all the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
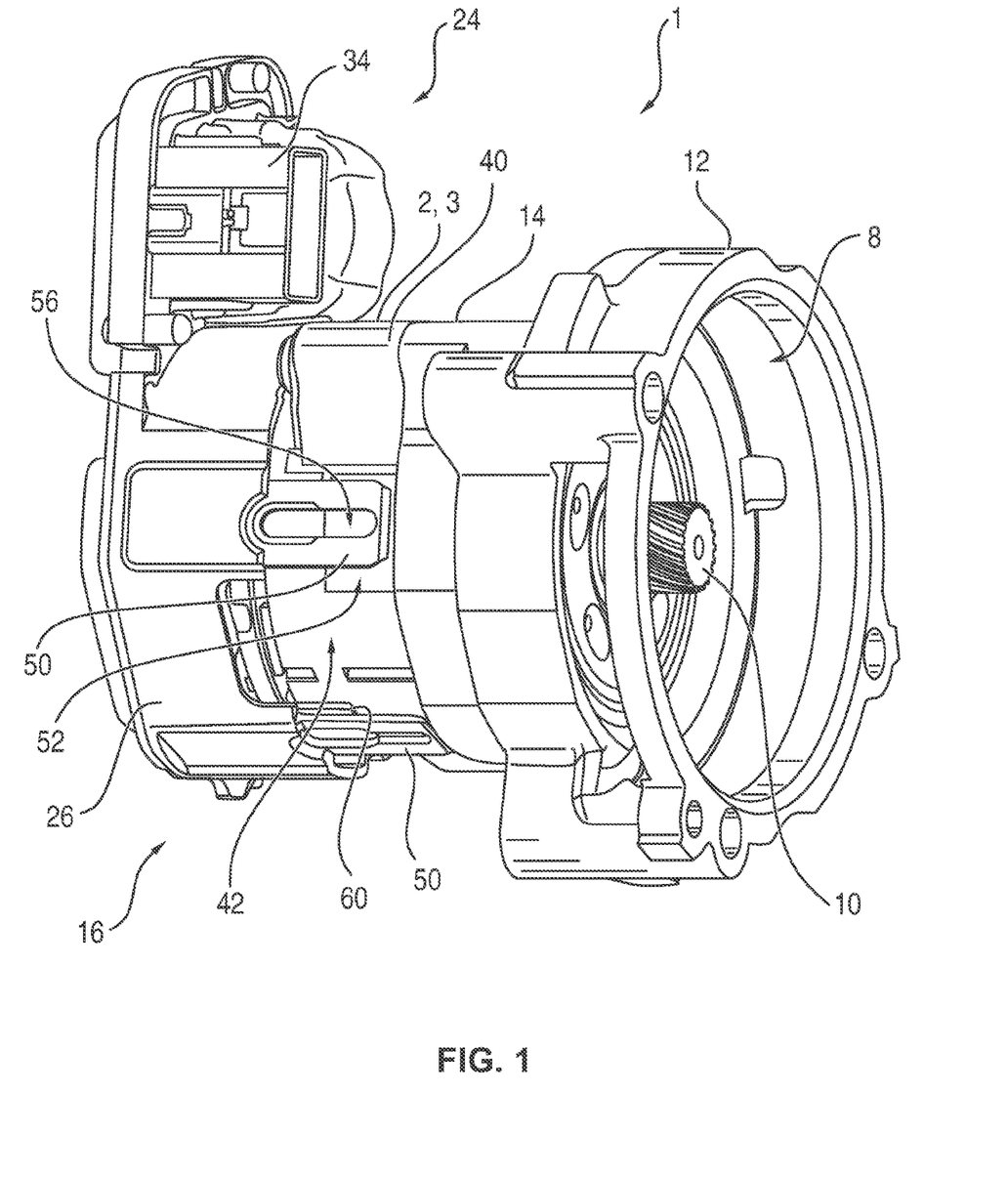
FIG. 1 is a schematic perspective view of an electric machine.
Figure 2:
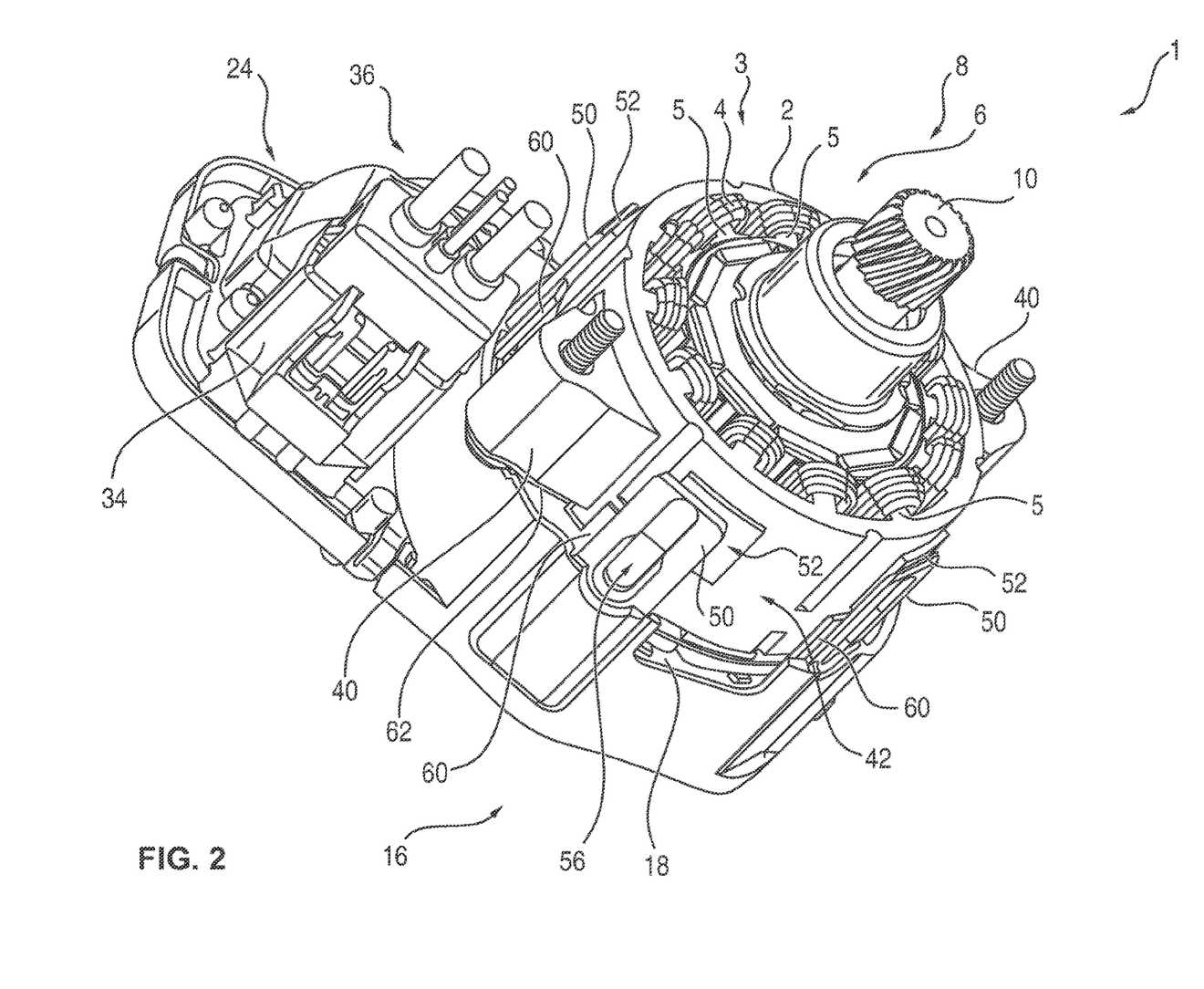
FIG. 2 is a further schematic perspective view of the electric machine in a partially mounted state.
Figure 3:
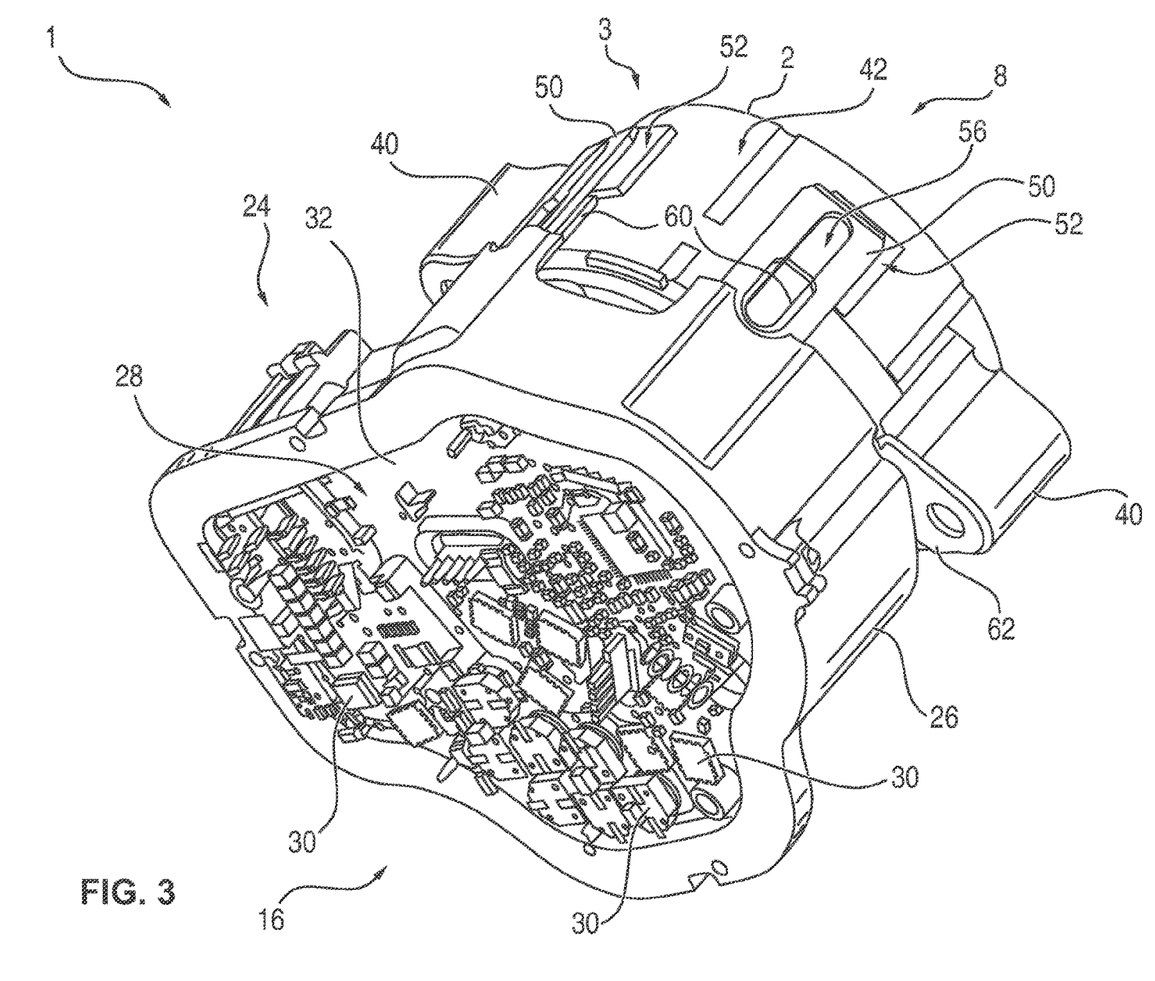
FIG. 3 is yet a further schematic perspective view of the electric machine in a partially mounted state.

FIG. 1 shows schematically an electric machine, referred to hereinbelow as an electric motor 1. The electric motor 1 has a laminated stator core 2, which is part of a stator 3 (see FIG. 2). The stator 3 has, in addition to the laminated stator core 2, also stator windings 4 formed of an electrically conductive wire. These stator windings 4 are wound on an inner side of the substantially tubular laminated stator core 2 over "teeth 5" of the laminated stator core 2. The electric motor 1 additionally has—as can be seen in FIG. 2—a rotor 6 which is arranged radially on the inside relative to the laminated stator core 2 and which has on an output side, also referred to hereinbelow as the A-side 8 of the electric motor 1, a toothed wheel 10 for coupling with a transmission, not shown in greater detail, which is arranged downstream of the electric motor 1 on the output side.

Part of a transmission housing 12 for this transmission is shown in FIG. 1. This transmission housing 12 is flange-mounted on the electric motor 1 on the A-side 8. Between the transmission housing 12 and the stator 3 there is arranged an A-side bearing plate 14, which carries a bearing, not shown in greater detail, for the rotor 6. On a B-side 16 (or: "rear side", see FIG. 4) opposite (or remote from) the A-side 8 there is arranged a B-side bearing plate 18 which carries a radial bearing 20 for the rotor 6, specifically for a rotor shaft 22 of the rotor 6.

The electric motor 1 additionally has a functional support 24 which is arranged on the B-side 16 on the stator 3, specifically on the laminated stator core 2. The functional support 24 may include an injection-molded plastic housing 26 which provides a housing interior 28 at the end face for a circuit board 32 equipped with electronic components 30. This circuit board 32, together with the electronic components 30, forms a control electronics, referred to as the motor controller for short, for the electric motor 1. There is additionally arranged on the functional support 24 a plug-type connection 34 for a cable harness 36 which is illustrated in FIG. 2. This cable harness 36 serves to supply power and to feed control signals to the electric motor 1.

The electric motor 1 is in the form of a motor without a stator housing. That is to say, the stator 3 is not surrounded by a housing on its lateral outer side 42. Therefore, for the mounting of the A-side bearing plate 14 and the downstream transmission housing 12, flange wings 40 are formed on the laminated stator core 2. These flange wings 40 are formed by radial projections of only some of the stator laminations (not shown individually) forming the laminated stator core 2.

In order to keep the radial construction of the electric motor 1 as small as possible, such as in the region of the stator 3, the functional support 24 and the B-side bearing plate 18 are not screwed to the laminated stator core 2 or fixed thereto by means of other, additional connecting elements. Instead, the functional support 24 has as connecting means four metal lugs 50, which are formed by a metal sheet that is thin-walled compared to the diameter of the stator 3. These metal lugs 50 are injection molded into the plastic housing 26 of the functional support 24 and lie flat against the lateral outer surface 42, specifically against contact surfaces 52 of the laminated stator core 2 that are raised by approximately the thickness of a metal sheet forming the B-side bearing plate 18. The metal lugs 50 are welded to the contact surfaces 52 of the laminated stator core 2.

Figure 4:
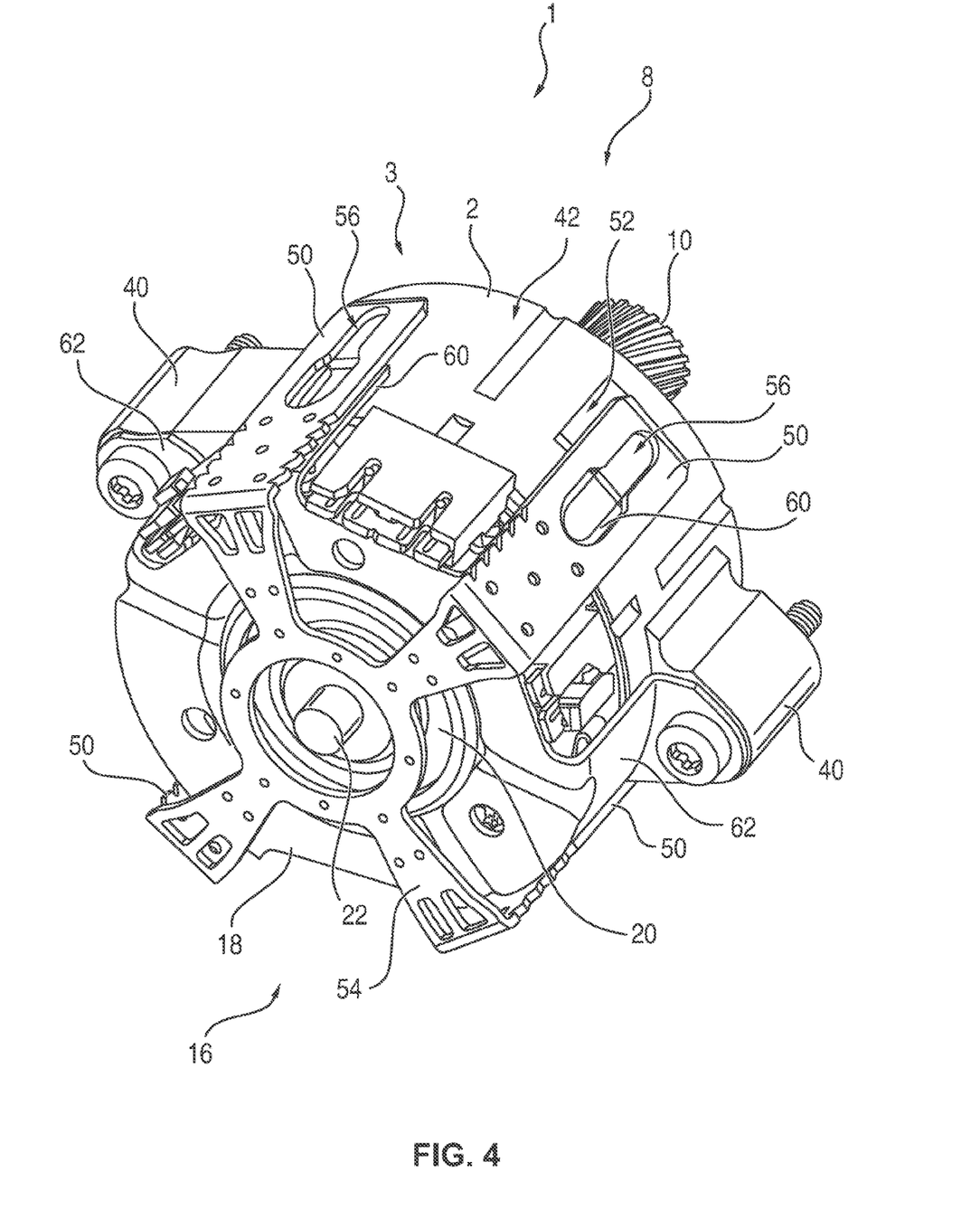
FIG. 4 is a further schematic perspective view of the electric machine in a partially mounted state with some components hidden.
Figure 5:
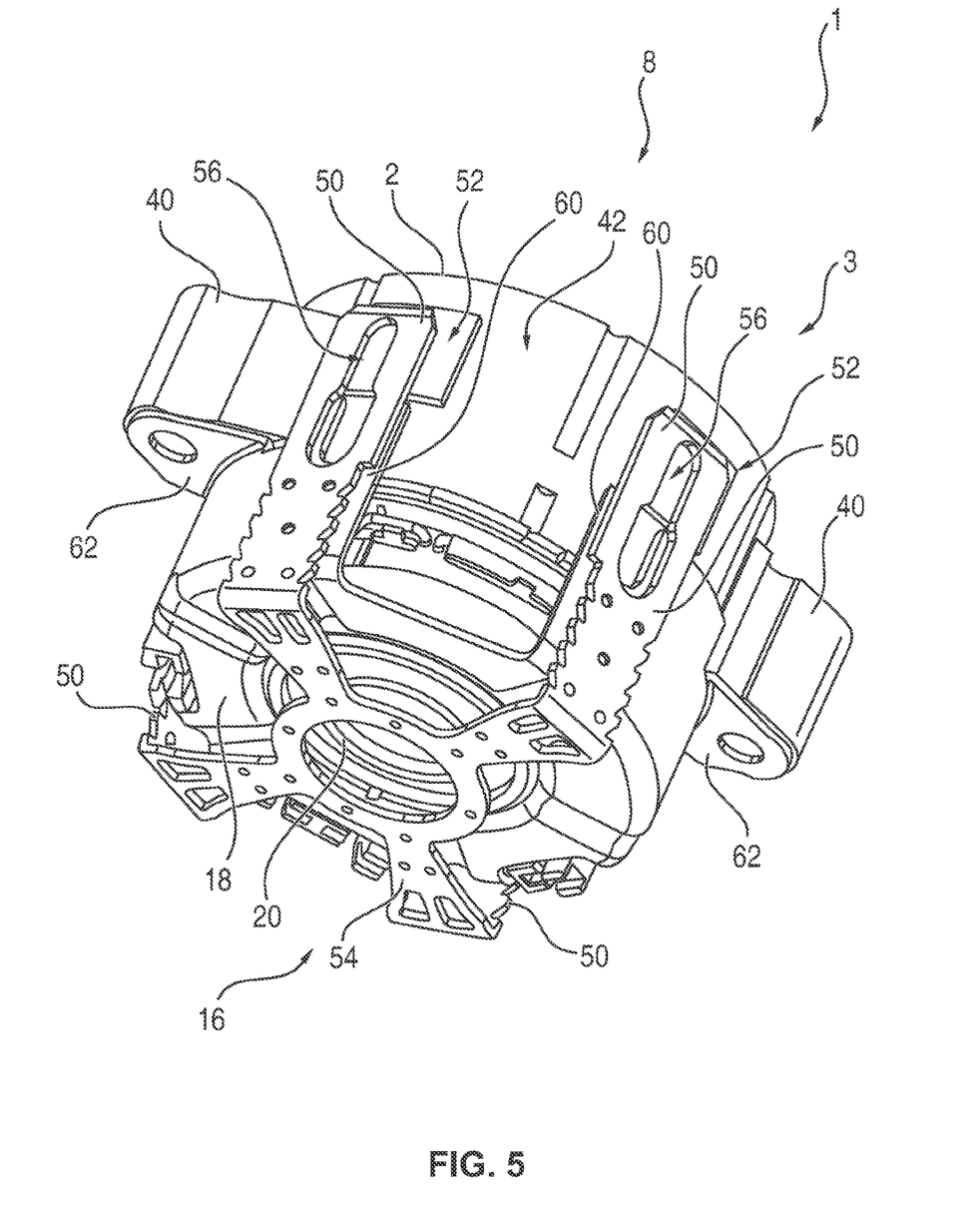
FIG. 5 shows, in a view according to FIG. 4, the electric machine in a further partially mounted state.

As is shown in greater detail in FIG. 4, the metal lugs 50 are each formed by a beam or arm of a star- or X-shaped stamped sheet-metal part 54. This stamped sheet-metal part 54 is located in the plastic housing 26 of the functional support 24 with its center at the end face relative to the stator 3. The metal lugs 50 are thereby bent away from the center of the stamped sheet-metal part 54 parallel to the rotor axis 22 and the lateral outer surface 42 of the stator 3. At the free end of each metal lug 50, a keyhole-like slot 56 is additionally introduced. The welded connection of the metal lug 50 with the contact surface 52 of the laminated stator core 2 takes place inside this slot 56.

For mounting, the functional support 24 is pushed with a stop (not shown) formed on the inside of the plastic housing 76 against the B-side bearing plate 18 and then the metal lugs 50 are welded. For centering of the functional support 24 relative to the stator 3, the plastic housing 26 of the functional support 24 has centering ribs, not shown in greater detail, which are brought into contact with a region of the B-side bearing plate 18 that is formed as precisely as possible in terms of its outside diameter.

The B-side bearing plate 18 has mounting lugs 60 which are bent, in a comparable manner to the metal lugs 50, parallel to the lateral outer surface 42 and which are arranged radially inside the metal lugs 50, that is to say beneath the metal lugs 50, and are brought into contact with the lateral outer surface 42. The mounting lugs 60 are thereby welded to the lateral outer surface 42 of the laminated stator core 2 through the keyhole-like slot 56 of the metal lugs 50. Because the mounting lugs 60 are arranged beneath the metal lugs 50, the gap arranged in the circumferential direction between the mounting lugs 60, or the metal lugs 50, can be used, for example, to form electrical connections between the motor controller and the stator 3. The B-side bearing plate 18 additionally also has two flange lugs 62 which are screwed to the flange wings 40.

The subject-matter of the invention is not limited to the exemplary embodiment described hereinbefore. Rather, further embodiments of the invention can be derived from the preceding description by the person skilled in the art.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 electric motor
2 laminated stator core
3 stator
4 stator winding
5 tooth
6 rotor
8 A-side
10 toothed wheel
12 transmission housing
14 bearing plate
16 B-side
18 bearing plate
20 radial bearing
22 rotor shaft
24 functional support
26 plastic housing
28 housing interior
30 component
32 circuit board
34 plug-type connection
36 cable harness
40 flange wing
42 lateral outer surface
50 metal lug
52 contact surface
54 stamped sheet-metal part
56 slot 60 mounting lug
62 flange lug While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An electric machine comprising:
   an internal rotor provided with a laminated stator core; and
   a functional support arranged on a rear side of the laminated stator core remote from an output side of the laminated stator core, wherein the functional support includes,
   a plastic housing and
   connecting means integrated into the plastic housing and protruding therefrom in an axial direction of the laminated stator core, wherein the functional support is connected to the laminated stator core by means of the connecting means at a lateral outer surface of the laminated stator core by positive engagement and/or substance-to-substance bonding in the axial direction,
   wherein the connecting means are formed by a plurality of metal lugs embedded into the plastic housing by injection molding, and wherein the plurality of metal lugs are welded to a lateral outer surface of the laminated stator core.

2. The electric machine of claim 1, wherein the functional support is centered radially relative to the laminated stator core.

3. The electric machine of claim 2, wherein the functional support is centered relative to the laminated stator core by means of centering ribs and/or by means of the connecting means.

4. The electric machine of claim 1, wherein the laminated stator core includes a radially protruding contact surface configured to engage each metal lug of the plurality of metal lugs.

5. The electric machine of claim 1, wherein the plurality of metal lugs are formed by beams, bent in the axial direction, from a one-piece, star-shaped stamped sheet-metal part, the center of which is arranged on an end face of the laminated stator core.

6. The electric machine of claim 1, wherein the functional support abuts the laminated stator core or a B-side bearing plate arranged on the rear side of the laminated stator core in an axial direction.

7. The electric machine of claim 6, wherein the functional support is spaced apart in the axial direction from the rear side of the laminated stator core or from the B-side bearing plate.

8. The electric machine of claim 1, further comprising:
   a B-side bearing plate manufactured from metal and provided with mounting lugs lying against a lateral outer surface of the laminated stator core and welded thereto.

9. The electric machine of claim 1, wherein the laminated stator core, in an intended final mounted state, does not include a stator housing circumferentially surrounding the laminated stator core.

10. The electric machine of claim 2, wherein the functional support is centered radially relative to a B-side bearing plate arranged on the rear side of the laminated stator core.

11. An electric motor comprising:
    an internal rotor provided with a laminated stator core including a lateral outer surface and a number of contact surfaces disposed on the lateral surface;
    a plastic housing configured to house a motor controller and disposed on a B-side of the laminated core, the B-side opposite an output side; and
    a first bracket including a number of radially extending arms, disposed on the B-side of the laminated core, and a number of metal lugs extending from the number of radially extending arms and including a first portion, embedded within the plastic housing, and a second portion lying along the lateral outer surface and fixed to the number of contact surfaces.

12. The electric motor of claim 11, wherein the first bracket is configured to center the plastic housing with respect to the laminated core.

13. The electric motor of claim 11, further comprising:
    a B-side bearing plate including a number of arms, each of the arms including a radially extending portion and an axially extending portion, wherein the second portion of the metal lugs are sandwiched between the axially extending portion and the lateral surface.

14. The electric motor of claim 13, wherein the radially extending portion of each of the arms is X-shaped.

15. The electric motor of claim 13, wherein the second portion of the number of metal lugs define slot and the axially extending portion of the number of arms are connected to the outer lateral surface by a weld seam disposed within the slot.

16. The electric motor of claim 13, wherein the laminated stator core includes a number of laminations provided with a radially extending projection collectively forming a flange extending from the outer lateral surface, and the B-side bearing plate includes a flange lug configured to engage the flange.

17. An electric motor comprising:
    an internal rotor provided with a laminated stator core including a lateral outer surface;
    a plastic housing configured to house a motor controller and disposed on a B-side of the laminated core, the B-side opposite an output side;
    a first bracket including a number of mounting lugs axially extending along the lateral surface; and
    a second bracket including a number of metal lugs lying along and contacting each of the mounting lugs of the number of mounting lugs, wherein the number of metal lugs are embedded into the plastic housing by injection molding and wherein the number of metal lugs are welded to a lateral outer surface of the laminated stator core.

18. The electric motor of claim 17, further comprising:
    a number of contact surfaces radially extending from the lateral outer surface, wherein the number of metal lugs are fixed to the number of contact surfaces.

19. The electric motor of claim 18, wherein each of the mounting lugs terminate at each of the contact surfaces of the number of contact surfaces.

* * * * *